(12) United States Patent
Freitas et al.

(10) Patent No.: US 11,354,545 B1
(45) Date of Patent: Jun. 7, 2022

(54) AUTOMATED DATA GENERATION, POST-JOB VALIDATION AND AGREEMENT VOTING USING AUTOMATIC RESULTS GENERATION AND HUMANS-IN-THE-LOOP, SUCH AS FOR TASKS DISTRIBUTED BY A CROWDSOURCING SYSTEM

(71) Applicant: DefinedCrowd Corporation, Seattle, WA (US)

(72) Inventors: Joao Freitas, Lisbon (PT); Miguel Lourenco, Lisbon (PT); Rui Correia, Lisbon (PT)

(73) Assignee: DefinedCrowd Corporation, Seattle, WA (US)

( * ) Notice: Subject to any disclaimer, the term of this patent is extended or adjusted under 35 U.S.C. 154(b) by 156 days.

(21) Appl. No.: 16/796,203

(22) Filed: Feb. 20, 2020

Related U.S. Application Data

(60) Provisional application No. 62/812,211, filed on Feb. 28, 2019.

(51) Int. Cl.
    *G06K 9/62* (2022.01)
    *G06N 20/20* (2019.01)
(52) U.S. Cl.
    CPC ......... *G06K 9/6263* (2013.01); *G06K 9/6256* (2013.01); *G06N 20/20* (2019.01)

(58) Field of Classification Search
    CPC ..... G06K 9/6263; G06K 9/6256; G06N 20/20
    See application file for complete search history.

(56) References Cited

U.S. PATENT DOCUMENTS

2019/0294925 A1\* 9/2019 Kang ................... G06K 9/6256
2020/0193331 A1\* 6/2020 Larson ................. G06N 20/20

\* cited by examiner

*Primary Examiner* — David F Dunphy
(74) *Attorney, Agent, or Firm* — Perkins Coie LLP

(57) ABSTRACT

Systems and methods that use machine learning to optimize the execution of micro-tasks, by partially automating the generation and validation actions are disclosed. The system uses a combination of automatic intelligent model-based decision systems and human-in-the-loop for generating annotated task instances with respect to an identified task. Before a task is executed, the system can compute the crowd effort to generate data for each task instance, as well as the effort to validate and/or correct them. These computations can occur multiple times during the execution of task. The generation, validation and correction effort are measures that allow the system to design more efficient workflows that combine machine learning models and human input because the system can decide automatically what is the most efficient next step to obtain the best results.

19 Claims, 6 Drawing Sheets

AUTOMATED DATA GENERATION, POST-JOB VALIDATION AND AGREEMENT VOTING USING AUTOMATIC RESULTS GENERATION AND HUMANS-IN-THE-LOOP, SUCH AS FOR TASKS DISTRIBUTED BY A CROWDSOURCING SYSTEM

CROSS-REFERENCE TO RELATED APPLICATION(S)

This application claims the benefit of U.S. Provisional Patent Application No. 62/812,211 filed on Feb. 28, 2019, entitled AUTOMATED DATA PROCESSING, POST-JOB VALIDATION AND AGREEMENT VOTING USING AUTOMATIC RESULTS GENERATION AND HUMANS-IN-THE-LOOP, SUCH AS FOR TASKS DISTRIBUTED BY A CROWDSOURCING SYSTEM, which is incorporated herein by reference in its entirety

BACKGROUND

A crowdsourcing system automatically distributes instances of a given task to a group of human workers (or "crowd members") that execute those task instances ("micro-tasks") according to given task requirements or goals. When a crowd member performs a micro-task, the crowd member can be rewarded with a small amount of money, or other rewards.

Machine Learning (ML) is a category of algorithms that allows a given application to predict outcomes without being explicitly programmed for those purposes. The basic premise of machine learning is to build algorithms that can receive input data and use statistical analysis to predict an output while updating outputs as new data becomes available.

Machine learning algorithms are often categorized as supervised or unsupervised. Supervised algorithms require data to be properly annotated, structured, and cleaned. This type of algorithms operates based on some optimization goal that tries to map a given input to the known output. Training might involve multiple steps operated, or not, by humans to devise which variable or features the model should analyze and use to develop predictions. Once training is complete, the algorithm will apply what was learned to new data.

Unsupervised algorithms do not need to be trained with desired outcome data. Instead, they use an iterative approach to review data and arrive at conclusions. Unsupervised learning algorithms are often used for more complex processing tasks than supervised learning systems, including image recognition, speech-to-text and natural language generation, or for situations in which data separation is not clear or happen in high dimensional cases. Unsupervised methods work by combing through millions of examples of training data and automatically identifying often subtle correlations between many variables. Once trained, the algorithm can use its bank of associations to interpret new data. These algorithms have only become feasible in the age of big data, as they require massive amounts of training data.

DETAILED DESCRIPTION

Figure 1:
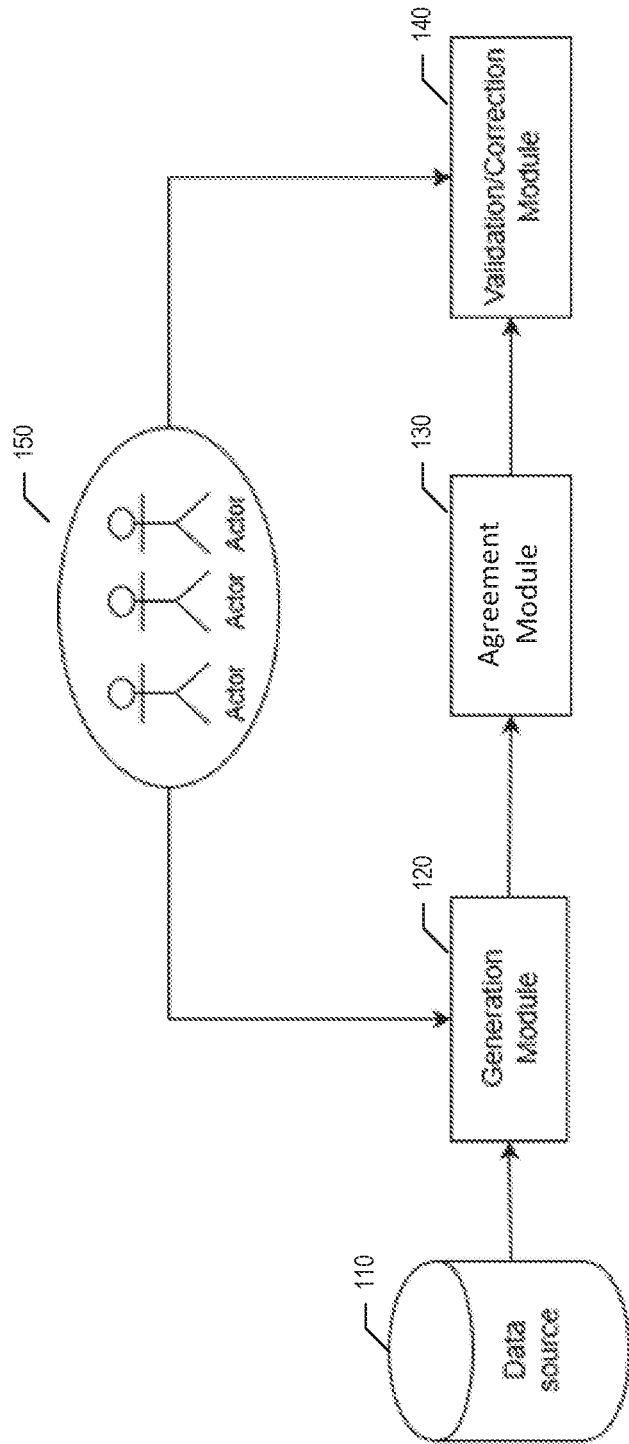
FIG. 1 is a data flow diagram showing at a high level a workflow implemented by the system in some embodiments.

The inventors have recognized several disadvantages of having tasks performed by human crowd members including that such systems are, a) expensive to employ (if paid fairly), b) have unpredictable throughput, c) suffer from fluctuation(s) of performance over time of the same or several crowd members, and d) take a long time to execute tasks. Crowdsourcing micro-tasks are often composed of repetitive actions, which associated with time and task complexity, result in degradation of human performance not suffered by machine learning systems.

To mitigate these disadvantages, the inventors have conceived and reduced to practice a system that uses machine learning to optimize the execution of micro-tasks, by partially automating the generation and validation actions.

Human-level performance refers to the success rate a human achieves when performing a given task. To achieve or exceed human-level performance and decrease the amount of data required to be manipulated by the crowd, the system in some embodiments uses active learning, transfer learning, and multitask optimization techniques that enable the reuse of knowledge across independent tasks. Multi-task optimization involves solving several problems sharing commonalities by exploring the knowledge transfer among tasks (transfer learning) and optimization of multiple micro-problems (multi-task learning).

The system can be applied to any type of crowdsourcing task, including but not limited to, image object annotation, image categorization, text variant collection, named entity tagging, semantic annotation, and mean-opinion score tests, just to name a few.

As used herein, the term "task" refers to a kind of activity, while the term "task instance" refers to a specific example of that activity. Typically, each instance of a task has the same instructions, and the same result type, both of which are defined for the task. For example, one task may have the instructions "Click on the most visually appealing part of the image," and the result type intra-image coordinates. Instances of a task are distinguished by task instance data specified for each task instance. For example, for the sample task above, a first task instance would have an image of a billboard as its task instance data, while a second instance would have as its task instance data an image of the front of a home. When a crowd member is executing a task instance, the task data is combined with the task instance data. In terms of the above example, the instructions "Click on the most visually appealing part of the image" are displayed with the image specified for the task instance, and intra-image coordinates are collected from the crowd member's click inside the image.

Crowdsourcing systems support different types of workflows. A workflow can have generation and validation/ correction actions. The generation action is where the crowd members generate new data (e.g. scripted speech data collection where the crowd members records several utterances) or perform data annotation (e.g. named-entity tagging where the crowd members tag entities according to an ontology). The validation action is where the results from the generation action are validated and, optionally, corrected. This second action is a quality step in the workflow to increase the confidence on the generation action results. Depending on the task, the system may be designed in a way that tasks classified as invalid go back to generation instead of asking a crowd member to correct it.

In some embodiments, the system uses a combination of automatic intelligent model-based decision systems and human-in-the-loop for generating annotated task instances with respect to an identified task. The system can use existing ML models or start by using task instances processed by humans to train one or multiple models that can potentially generate automatic results according to a given set of requirements/goals, which in some cases are validated by some other judgement source (validation action), human or not.

Before the task is executed, the system can compute the crowd effort to generate data for each task instance, as well as the effort to validate and/or correct them. These computations can occur multiple times during the execution of task. The generation, validation and correction effort are measures that allow the system to design more efficient workflows that combine ML models and human input because the system can decide automatically what is the most efficient next step to obtain the best results. Moreover, ML models can be trained and adapted as the crowd generates data and consistently measure the trade-off (in terms of effort) between the crowd generating more data, or correcting the models output, thus making humans focus on erroneous cases.

After all instances of a task are processed, the system applies automated analysis to identify abnormal patterns that may be the result of poor crowd member performance or malicious input from crowd members, among other reasons. The evaluation operates using a machine learning model (or an ensemble of machine learning models) to verify the quality of the processed task instances based on model vote agreement. Finally, the results aggregation serve three main purposes: verifying under multiple types of automatic systems the suitability of the data to be applied in practical terms, filtering outlier annotations that might have passed the first stage of correction, and generating high confidence observations, which in some embodiments is validated and/or corrected by a crowd member.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a data flow diagram showing at a high level a workflow implemented by the system in some embodiments. Crowd members ("actors") 150 interact with the system on initial manipulation of the data source 110 by a processing step in the generation module (generation action) 120, either by cleaning, structuring, annotating, or any other type of data interaction, and on validation/correction by the validation/correction module (validation action) 140 to verify if the generated data is valid and fulfills the task requirements. Examples of crowd members 150 include users, bot, or any combination thereof. An optional agreement module 130 automatically determines if results produced by different crowd members for the same task instance agree. For example, the agreement module 130 can determine that results produced by different crowd members for the same task instance agree when at least a threshold number of the results are the same and/or similar.

Figure 2:
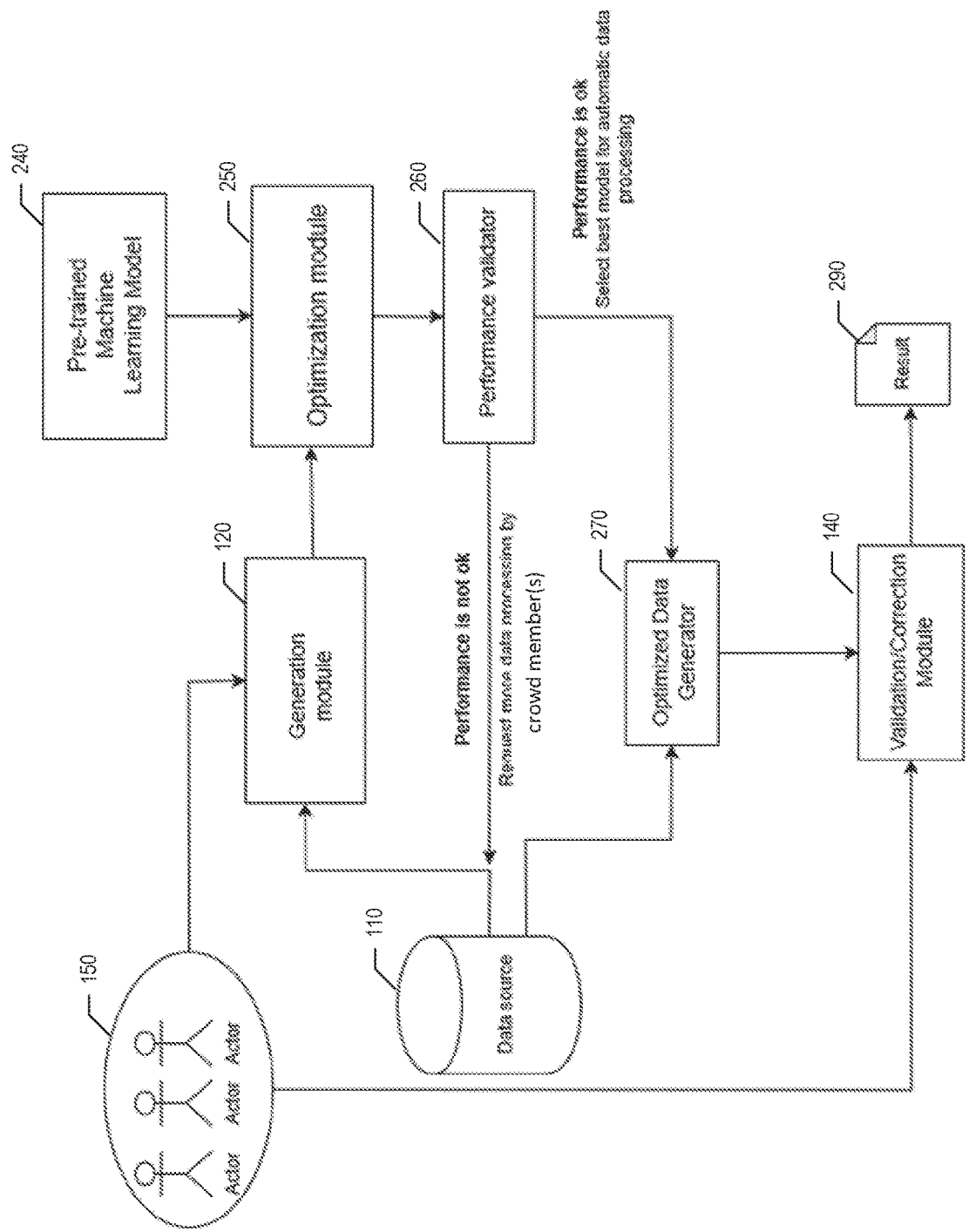
FIG. 2 is a data flow diagram showing at a more detailed level a workflow implemented by the system in some embodiments.

FIG. 2 is a data flow diagram showing, at a more detailed level, a workflow implemented by the system in some embodiments. After one or more crowd members 150 manipulates the data 110 in the data generation module 120 according to the task goals and submits it, the data is transferred to an optimization module 250 that is responsible for starting to devise an automated intelligent model solution. The intelligent systems used in the optimization module 250 can use any form machine learning, such as supervised learning, semi-supervised learning, unsupervised learning, reinforcement learning, or any combination. If an optimization module 250, adequate for the data source and with acceptable performance, already exists, then the data generation action 120 done by crowd members 150 can be skipped.

In some embodiments, the optimization module's model training is triggered when a specific and configurable percentage of the total set of micro-tasks is processed by crowd members 150. In various embodiments, the optimization module 250 starts from existing models 240 to initialize the learning of the system, uses models already available and optimizes them to the given task (transfer learning), or creates a completely new system capable of automatically generating results that fulfil the requirement of the task goals.

In various embodiments, the system is a single stage (single validation system) or a multi-stage system—either sequential or hierarchical—that combines multiple automatic machine learning systems.

The optimization module 250 is responsible for producing automatic generated results based on the requirement(s) of a given crowd source task. This system can be composed of several types of automatic learning approaches, including single model, multiple models sequential, multiple applied hierarchical fashion, and so on.

The performance validation module 260 verifies the suitability of using a machine learning system for automatic results generation. In various embodiments, this module acts based on various performance evaluation metrics; some examples include precision, accuracy, f1-score, recall, or any other evaluation metric that allows the measurement of similarity between the automatic generated result and the global task excepted results.

If the validation level determined by the performance validation module 260 is below a given configurable threshold or thresholds for a single or combination of metrics, respectively, the system requests that the crowd members 150 manipulate more data 210 accordingly to the requirements. This process proceeds until all the data is annotated by the crowd members, depending on the automatic system performance. When the configurable threshold or thresholds are reached or surpassed, the automatic system replaces the crowd members in the loop, and annotations are performed by the Optimized Data Generator 270.

Before outputting each task result 290, the generation module 120 can include a "validation/correction module" 140 where an independent player of the computing systems performs validation, correction, or both, of the results automatically generated by the optimization module 250. The independent player role can be performed either by ss or some type of computerized approach specialized in the task results, such as, for example, a model trained on all the processed data, a model trained on the correct data, one or more bots, or other approaches.

Figure 3:
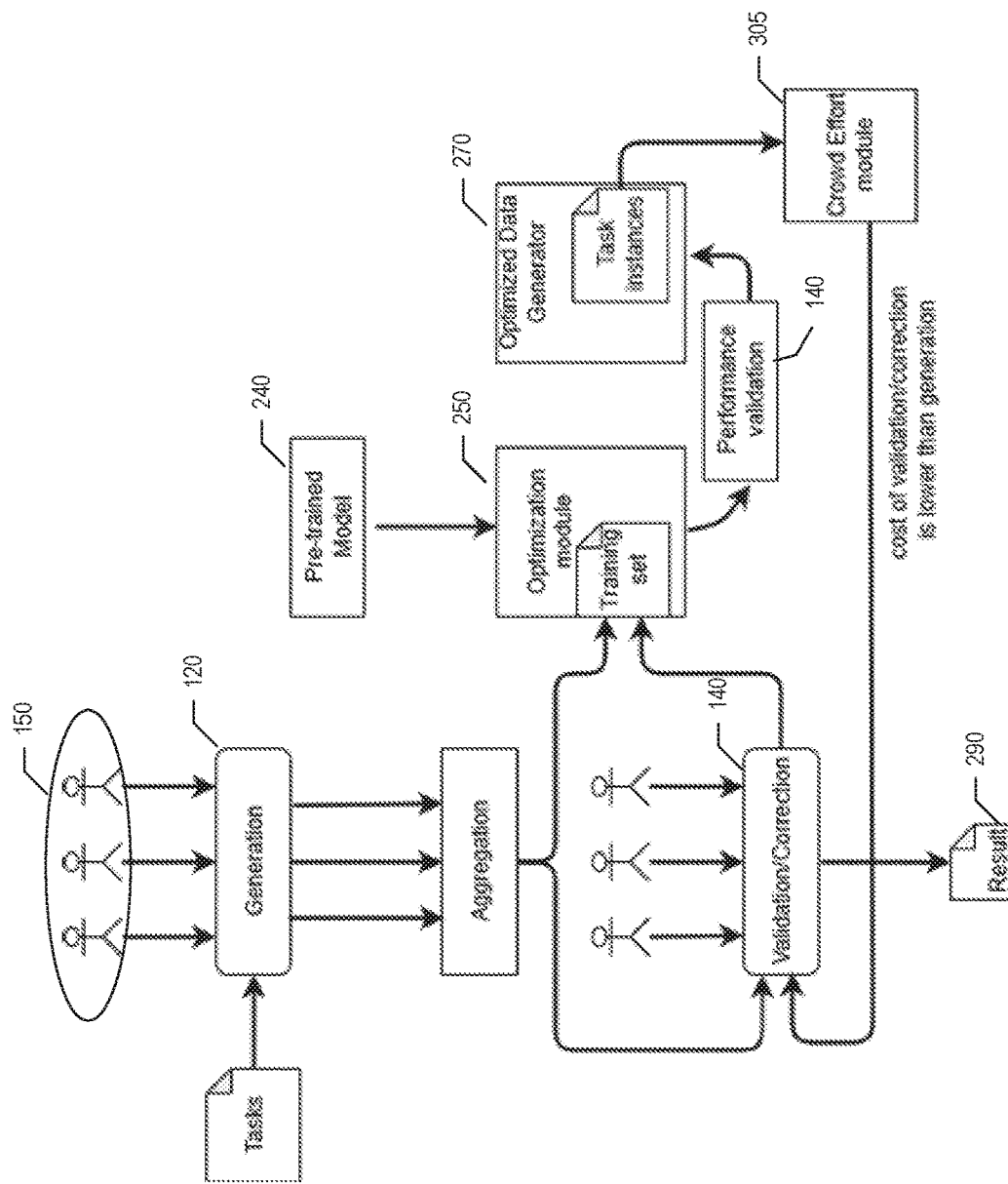
FIG. 3 is a data flow diagram showing how the system in some embodiments uses ML models to automatically generate tasks instances.

FIG. 3 is a data flow diagram that depicts a detailed level a workflow implemented by the system that complements in part the system depicted in FIG. 2. Specifically, FIG. 3 illustrates how the system in some embodiments uses ML models to automatically generate tasks instances, replacing the generation action 120 in the workflow (e.g. illustrated in FIG. 2), and determines if the model's output should be validated/corrected using an effort measure. After a threshold number of (and/or all) crowd members 150 manipulate the data in the data generation module according to the task goals and submit it, the data is transferred to an optimization module 250 that is responsible for starting to devise an automated intelligent model solution. In this data flow the optimization module 250 can receive aggregated data from the generation module 120, data from the validation/correction action 140, or both. In some embodiments, for some tasks, the system contemplates a crowd effort module 305 to evaluate the trade-off between a generation action and a validation or correction action. The crowd effort module 305 provides the heuristics to validate if validating/correcting the model's output presents a lower effort than generating data.

Figure 4:
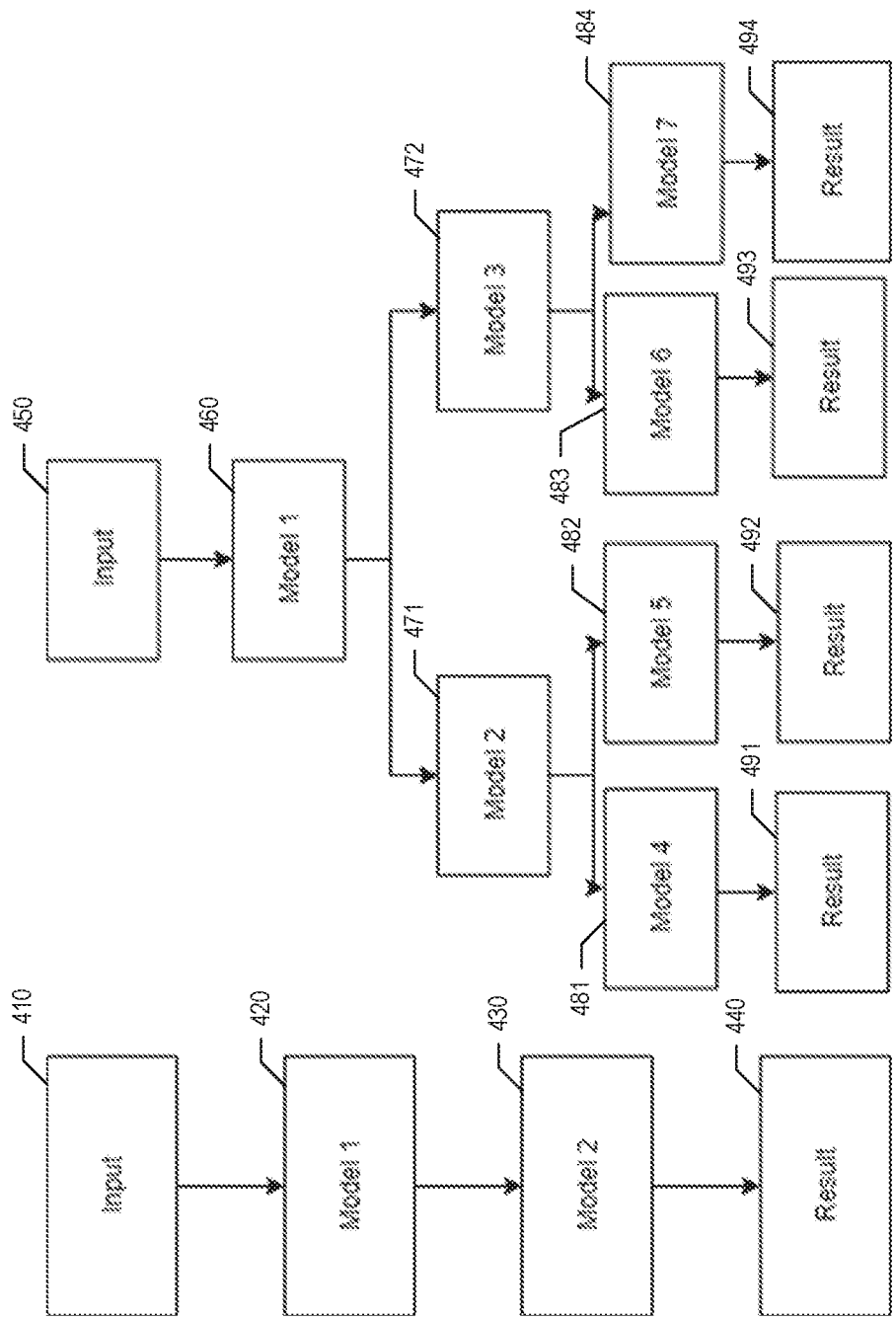
FIG. 4 depicts a possible multi-stage model architecture for automatic results generation used by the system acting as the generation module in some embodiments.

FIG. 4 depicts possible multi-stage model architecture for automatic results generation used by the system as part of the generation module 120 in some embodiments. In some embodiments, the optimization module 250 uses multiple automatic model architectures, equal or not, to generate the automated results 290. This methodology is called "ensemble learning," and generally refers to training a "large" number of models (where the exact value of "large" depends on the classification task), and then combining their output results via any aggregation method. FIG. 4 shows input 410 being processed by a sequential ensemble model, made up of constituent models 420 and 430, to obtain a result 440. In the sequential ensemble model, constituent models are organized in a sequence; the input flows into the first constituent model of the sequence, whose output propagates to the next constituent model of the sequence, and so on. For example, in the shown sequential ensemble model, the output of constituent model 420 propagates to constituent model 430. FIG. 4 also shows input 450 being processed by a hierarchical ensemble model, made up of constituent models 460, 471, 472, 481, 482, 483, and 484, to obtain results 491, 492, 493, and 494. In the hierarchical ensemble model, the output of a constituent model can flow to one or more other constituent models. For example, in the shown hierarchical ensemble model, the output of the constituent model 460 propagates to both constituent model 471 and constituent model 472.

Figure 5:
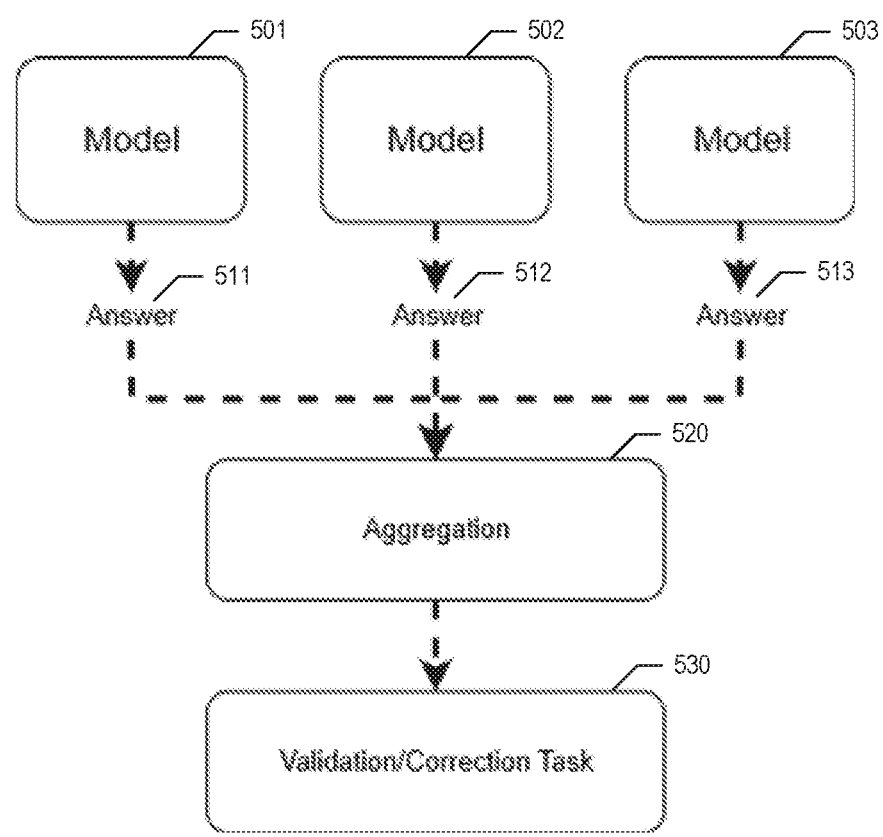
FIG. 5 is a data flow diagram showing how the system in some embodiments combines solutions from an ensemble of multiple single or multi-stage models to obtain a final processing result.

FIG. 5 is a data flow diagram showing how the system in some embodiments combines solutions 511-513 from an ensemble of multiple single or multi-stage models to obtain the final processing result 530. The aggregation process shown in FIG. 5 increases the probability of obtaining proper automatic generated results and improving the output of the overall system. In various embodiments, this is achieved by techniques like scoring averaging, maximal voting, graph-based methods, or any other type of aggregation technique 520.

In some embodiments, the generation module uses an agreement model based on the automatic models that can be used as the generation module to improve the output performance of the automatic generated micro-tasks. Same or different models' types that are configured to output results according to crowdsourcing task requirements are used to obtain multiple versions of the generation action.

At this point (unlike in the Generation module, where only some instances of the task are processed for training the single- or multi-stage model approaches); all the instances of the task are already processed, and in some cases corrected by crowd members. The system uses all the instances to train multiple models and build more accurate models that better fit the crowdsourcing task requirements. The consensus between the multiple models, whose number of instances are configurable, are then obtained via any consensus agreement strategy like majority vote, or any other strategy used to compute agreement decisions.

Using this approach for model agreement can also be used to remove outliers from processed data units. An outlier is a micro-task that was not executed according to the task requirements. If none of the models used during automatic agreement generation verifies the result of a micro-task as being performed according to the requirements, the micro-task is flagged as a possible outlier and can be verified by an external judgement sources, such as a crowd member, during the validation/correction action.

Figure 6:
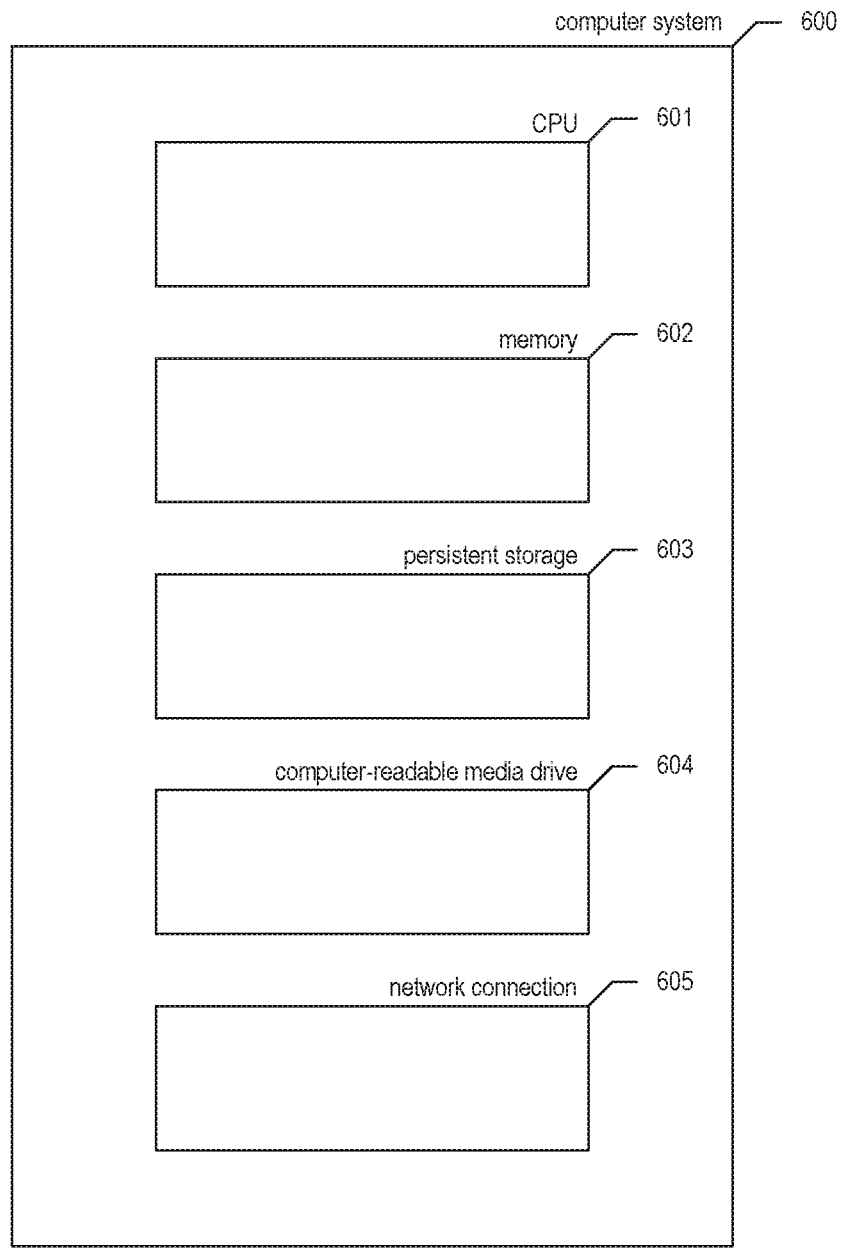
FIG. 6 is a block diagram showing some of the components typically incorporated in at least some of the computer systems and other devices on which the facility operates.

FIG. 6 is a block diagram showing some of the components typically incorporated in at least some of the computer systems and other devices on which the facility operates. In various embodiments, these computer systems and other devices 600 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 601 for executing computer programs; a computer memory 602 for storing programs and data while they are being used, including the facility and associated data, an operating system including a kernel, and device drivers; a persistent storage device 603, such as a hard drive or flash drive for persistently storing programs and data; a computer-readable media drive 604, such as a floppy, CD-ROM, or DVD drive, for reading programs and data stored on a computer-readable medium; and a network connection 605 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Remarks

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A method in a computing system for managing and optimizing the performance of instances of one or more tasks, comprising:

assigning a first set of one or more instances of a first task to one or more crowd members, the first task constituting a particular type of activity, instances of the first task of the first set constituting different examples of the first task's type of activity, which are distinguished by having different instance data;

collecting results produced for at least a portion of the first set of instances of the first task by the crowd members to whom they were assigned in a first data generation step;

using the collected results, together with the corresponding instance data, to train one or more machine learning models;

assigning a second set of one or more instances of the first task to the trained machine learning models;

collecting results produced for at least a portion of the second set of instances of the first task by the trained machine learning models to which they were assigned; and assigning results produced for at least a portion of the first set of instances of the first task, or results produced for at least a portion of the second set of instances of the first task, or both for validation to the one or more crowd members.

2. The method of claim 1 wherein the crowd members are users, bots, or any combination thereof.

3. The method of claim 1 wherein the one or more machine models are a plurality of machine learning models, and wherein the collecting comprises, for each of at least a portion of the second set of instances of the first task, aggregating the results produced for the task instance by the machine learning models of the plurality.

4. The method of claim 3 wherein the plurality of machine learning models are of two or more different model types.

5. The method of claim 1 wherein at least one of the trained machine learning models is a single-stage model.

6. The method of claim 1 wherein at least one of the trained machine learning models is an ensemble model.

7. The method of claim 6 wherein at least one of the trained machine learning models is a sequential ensemble model or a hierarchical ensemble model.

8. The method of claim 1, further comprising:
assigning a set of one or more instances of a second task distinct from the first task to the trained machine learning models, the second task constituting a different type of activity than the first task; and
collecting results produced for at least a portion of the set of instances of the second task by the trained machine learning models to which they were assigned.

9. The method of claim 1, further comprising:
identifying the result of a distinguished one of the first set of instances of the first task as an outlier; and
in response to the identifying, omitting the distinguished instance of the first task from the training.

10. The method of claim 1, further comprising:
for each particular set among multiple sets of one or more instances of the first task:
assigning the particular set of one or more instances of the first task to the trained machine learning models; and
collecting results produced for at least a portion of the particular set of instances of the first task by the trained machine learning models to which they were assigned,
wherein each particular set comprises a variable number of instances of the first task.

11. The method of claim 9 wherein the identifying is performed automatically.

12. The method of claim 9 wherein the identifying is performed in response to user input.

13. The method of claim 9 wherein the distinguished one of the first set of instances of the first task is assigned to two or more different crowd members, the method further comprising comparing the results produced for the distinguished one of the first set of instances of the first task by the different crowd members, and wherein the identifying is performed in response to the comparing discerning at least a threshold difference among the results produced for the distinguished one of the first set of instances of the first task by the different crowd members.

14. The method of claim 1, further comprising:
determining whether instances of the first task whose results are produced by the trained machine learning models satisfy one or more performance tests, and
only when it is determined that instances of the first task whose results are produced by the trained machine learning models satisfies the performance tests, outputting results produced by the trained machine learning models for further use.

15. The method of claim 14, further comprising receiving input altering one of the performance tests, wherein the determining is performed using the altered one or more performance tests.

16. The method of claim 1, further comprising:
determining whether instances of the first task whose results are produced by the trained machine learning models satisfy one or more performance tests, and
when it is determined that instances of the first task whose results are produced by the trained machine learning models do not satisfy the performance tests, altering the trained machine learning models.

17. The method of claim 16, where in the altering comprises retraining the machine learning models using results produced by the crowd members for a new set of task instances.

18. A system comprising:
at least one hardware processor; and
at least one non-transitory memory storing instructions, which, when executed by the at least one hardware processor, cause the system to:
assign a first set of one or more instances of a first task to one or more crowd members, the first task constituting a particular type of activity, instances of the first set of the first task constituting different examples of the first task's type of activity, which are distinguished by having different instance data;
collect results produced for at least a portion of the first set of instances of the first task by the crowd members to whom they were assigned in a first data generation step;
use the collected results, together with the corresponding instance data, to train one or more machine learning models;
assign a second set of one or more instances of the first task to the trained machine learning models;
collect results produced for at least a portion of the second set of instances of the first task by the trained machine learning models to which they were assigned; and
assign results produced for at least a portion of the first set of instances of the first task, or results produced for at least a portion of the second set of instances of the first task, or both for validation to the one or more crowd members.

19. A computer-readable storage medium, excluding transitory signals and carrying instructions, which, when executed by at least one data processor of a system, cause the system to:

assign a first set of one or more instances of a first task to one or more crowd members, the first task constituting a particular type of activity, instances of the first task of the first set constituting different examples of the first task's type of activity, which are distinguished by having different instance data;

collect results produced for at least a portion of the first set of instances of the first task by the crowd members to whom they were assigned in a first data generation step;

use the collected results, together with the corresponding instance data, to train one or more machine learning models;

assign a second set of one or more instances of the first task to the trained machine learning models;

collect results produced for at least a portion of the second set of instances of the first task by the trained machine learning models to which they were assigned; and assign results produced for at least a portion of the first set of instances of the first task, or results produced for at least a portion of the second set of instances of the first task, or both for validation to the one or more crowd members.

* * * * *

UNITED STATES PATENT AND TRADEMARK OFFICE
CERTIFICATE OF CORRECTION

PATENT NO. : 11,354,545 B1
APPLICATION NO. : 16/796203
DATED : June 7, 2022
INVENTOR(S) : Freitas et al.

Page 1 of 1

It is certified that error appears in the above-identified patent and that said Letters Patent is hereby corrected as shown below:

In the Specification

In Column 1, Line 18, delete "entirety" and insert -- entirety. --.

In Column 6, Line 13, delete "approaches);" and insert -- approaches), --.

In Column 7, Line 39, delete "limited."" and insert -- limited to." --.

Signed and Sealed this
Thirtieth Day of August, 2022

Katherine Kelly Vidal
*Director of the United States Patent and Trademark Office*